Patented Aug. 8, 1933

1,921,338

UNITED STATES PATENT OFFICE 1,921,338

AZODYESTUFF

Paul Zervas, Cologne-Mulheim, and Heinrich Clingestein, Cologne-on-the-Rhine, Germany, assignors to General Aniline Works, Inc., New York, N. Y., a Corporation of Delaware No Drawing. Application August 6, 1932, Serial No. 627,810, and in Germany September 10, 1931

4 Claims. (Cl. 260—92)

The present invention relates to new azodyestuffs, more particularly it relates to dyestuffs which may be represented by the probable general formula:

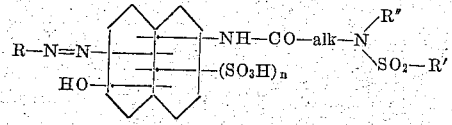

wherein R stands for a radical of the benzene series, for example, for a benzene nucleus which may be substituted by halogen, alkyl, alkoxy or a nitro group, R' stands for alkyl, aralkyl or aryl, for example, for methyl, ethyl or benzyl, in which the nucleus may be substituted for example by halogen, methyl, ethyl, methoxy, ethoxy, or for a benzene nucleus which may be substituted for example by halogen, methyl, ethyl, methoxy and ethoxy, R'' stands for hydrogen, alkyl, aralkyl or aryl, for example, for methyl, ethyl or benzyl, in which the nucleus may be substituted for example by halogen, methyl, ethyl, methoxy, ethoxy, or for a benzene nucleus which may be substituted, for example by halogen, methyl, ethyl, methoxy and ethoxy, "alk" stands for an alkylene group, for example, for methylene, ethylene or butylene, "n" stands for the numbers one or two, the azo bridge being attached to the naphthalene nucleus in o-position to the hydroxy group.

Our new dyestuffs are obtainable by diazotizing a primary amine of the benzene series and coupling in alkaline solution with a coupling component of the general formula:

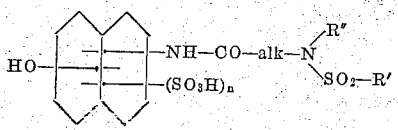

wherein R', R'', "alk" and "n" mean the same as stated above.

The coupling components used in our invention are obtainable, for example, by the action of ammonia or primary alkyl-, aralkyl- or arylamines upon alkyl-, aralkyl- or arylsulfonic acid chlorides, condensation with a halogen fatty acid, transforming the halogen fatty acid derivative into the corresponding acid chloride according to known methods, and finally condensing the acid chloride with an aminonaphtholsulfonic acid.

Our new dyestuffs are in form of their alkali metal salts generally dark red powders, dyeing wool from an acid bath generally red shades of good fastness to fulling and light.

The invention is illustrated by the following examples without being limited thereto:

*Example 1.*—To a soda alkaline solution of 53 parts by weight of p-toluenesulfaminoacetyl-1-amino-8-hydroxynaphthalene-3.6-disulfonic acid there is added a diazobenzene solution of 9,3 parts by weight of aniline. The isolated dyestuff dyes wool red shades; in its free state it has the following formula:

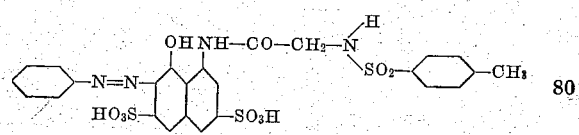

A dyestuff having similar properties, but dyeing somewhat more yellowish red is obtained by substituting the aniline by 12,75 parts by weight of p-chloroaniline.

*Example 2.*—A diazobenzene solution of 9,3 parts by weight of aniline is added to a soda alkaline solution of 54,4 parts by weight of p-toluenesulfo-N-methylaminoacetyl-1-amino-8-hydroxynaphthalene-4.6-disulfonic acid. The dyestuff thus isolated dyes wool red shades of good fastness to fulling. In its free state the dyestuff has the following formula:

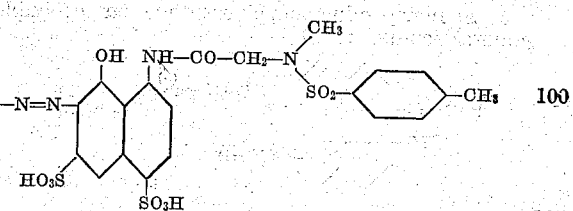

A dyestuff having similar properties is obtained when substituting the p-toluenesulfo-N-methylaminoacetyl-1-amino-8-hydroxynaphthalene-4.6-disulfonic acid by 55,8 parts by weight of p-toluenesulfo-N-ethylaminoacetyl-1-amino-8-hydroxynaphthalene-4.6-disulfonic acid.

*Example 3.*—A diazotoluene solution of 10,7 parts by weight of o-toluidine is coupled with a soda alkaline solution of 46,4 parts by weight of p-toluenesulfo-N-methylaminoacetyl-2-amino-8-hydroxynaphthalene-6-sulfonic acid. The dyestuff thus obtained dyes wool red shades of good fastness to fulling. In its free state it has the following formula:

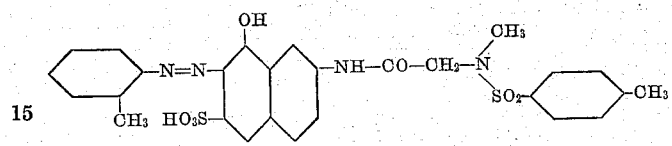

Dyestuffs having similar properties are obtained when replacing the o-toluidine by 12,3 parts by weight of p-anisidine, or when replacing the p-toluenesulfo-N-methylaminoacetyl-2-amino-8-hydroxynaphthalene-6-sulfonic acid by 54 parts by weight of p-toluenesulfo-N-benzylaminoacetyl-2-amino-8-hydroxynaphthalene-6-sulfonic acid.

*Example 4.*—A diazobenzene solution of 9,3 parts by weight of aniline is coupled with a soda alkaline solution of 46,8 parts by weight of methanesulfo-N-methylaminoacetyl-1-amino-8-hydroxynaphthalene-4.6-disulfonic acid. The dyestuff thus obtained dyes wool red shades. In its free state it has the following formula:

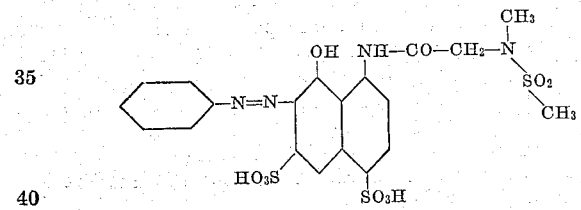

Dyestuffs having similar properties are obtained when replacing the methanesulfo-N-methylaminoacetyl-1-amino-8-hydroxynaphthalene-4.6-disulfonic acid by 48,2 parts by weight of methanesulfo-N-methylamino-propionyl-1-amino-8-hydroxynaphthalene-4.6-disulfonic acid, or by 54,4 parts by weight of benzylsulfo-N-methylaminoacetyl-1-amino-8-hydroxynaphthalene-4.6-disulfonic acid.

We claim:

1. As new products azodyestuffs of the probable general formula:

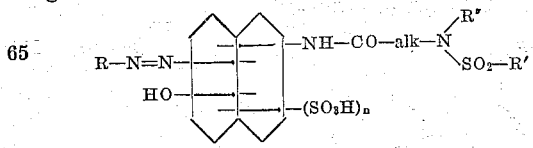

wherein R stands for a radical of the benzene series, R' stands for alkyl, aralkyl or aryl, R'' stands for hydrogen, alkyl, aralkyl or aryl, "alk" stands for an alkylene group, "$n$" stands for one of the numbers one and two, the azo bridge being attached to the naphthalene nucleus in o-position to the hydroxy group, being in form of their alkali metal salts generally dark red powders, dyeing wool generally red shades of good fastness to fulling and light.

2. As new products azodyestuffs of the probable general formula:

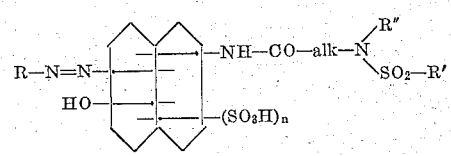

wherein R stands for a benzene nucleus which may be substituted by substituents selected from the group consisting of halogen, alkyl, alkoxy and the nitro group, R' stands for methyl, ethyl or a radical of the benzene series, R'' stands for hydrogen, methyl, ethyl or a radical of the benzyl series, "alk" stands for a methylene or ethylene group, "$n$" stands for one of the numbers one and two, the azo bridge being attached to the naphthalene nucleus in o-position to the hydroxy group, being in form of their alkali metal salts generally dark red powders, dyeing wool generally red shades of good fastness to fulling and light.

3. As a new product the azodyestuff of the following formula:

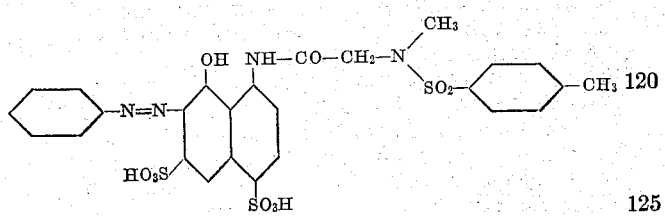

being in form of its alkali metal salts a dark red powder, dyeing wool red shades of good fastness properties.

4. As a new product the azodyestuff of the following formula:

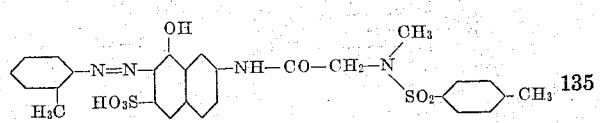

being in form of its alkali metal salts a dark red powder, dyeing wool red shades of good fastness properties.

PAUL ZERVAS.
HEINRICH CLINGESTEIN.